(12) United States Patent
Isshiki

(10) Patent No.: US 8,031,565 B2
(45) Date of Patent: Oct. 4, 2011

(54) OPTICAL PICKUP AND OPTICAL INFORMATION REPRODUCTION SYSTEM

(75) Inventor: Fumio Isshiki, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 628 days.

(21) Appl. No.: 11/828,445

(22) Filed: Jul. 26, 2007

(65) Prior Publication Data

US 2008/0181083 A1   Jul. 31, 2008

(30) Foreign Application Priority Data

Dec. 20, 2006   (JP) ................................. 2006-342069

(51) Int. Cl.
*G11B 7/00* (2006.01)

(52) U.S. Cl. ............... 369/44.32; 369/53.35; 369/44.27; 369/47.14

(58) Field of Classification Search ............... 369/44.25, 369/47.17, 112.01, 112.03, 53.33, 53.3, 44.32, 369/47.29, 53.35, 53.42

See application file for complete search history.

(56) References Cited

U.S. PATENT DOCUMENTS

| | | | | |
|---|---|---|---|---|
| 5,703,852 A | * | 12/1997 | Kumagai | 369/53.3 |
| 5,757,751 A | * | 5/1998 | Chapman | 369/53.33 |
| 6,490,234 B1 | * | 12/2002 | Okamoto et al. | 369/44.25 |
| 2002/0131352 A1 | * | 9/2002 | Kuribayashi et al. | 369/47.17 |
| 2006/0083146 A1 | * | 4/2006 | Isshiki et al. | 369/112.03 |

FOREIGN PATENT DOCUMENTS

| | | |
|---|---|---|
| JP | 01-315039 | 12/1989 |
| JP | 5-166194 | 7/1993 |
| JP | 06-342522 | 12/1994 |
| JP | 2002-42371 | 2/2002 |
| JP | 2006-114165 | 4/2006 |

OTHER PUBLICATIONS

Office Action issued in Japanese Patent Application No. 2006-342069 on Oct. 5, 2010.

* cited by examiner

*Primary Examiner* — Thuy Pardo

(74) *Attorney, Agent, or Firm* — Antonelli, Terry, Stout & Kraus, LLP.

(57) ABSTRACT

In an optical disk apparatus having an exclusive RF detector plane mounted therefore, as a method of obtaining a synthesized readout signal based on band-synthesis is used in order to obtain a readout signal having a good S/N ratio, a waveform distortion easily caused by a delay time difference or a sensitivity difference in the playback at higher speeds can be prevented. In order to correct the delay time difference or a sensitivity error in two channels of RF signals to be band-synthesized according to the selection of the sensitivity or playback speed, a delay time controller, a sensitivity controller, and a selector for selecting a combination method are engaged. An information holder for such control or selection is also provided.

16 Claims, 9 Drawing Sheets

"OPTICAL PICKUP AND OPTICAL INFORMATION REPRODUCTION SYSTEM

INCORPORATION BY REFERENCE

The present application claims priority from Japanese application JP2006-342069 filed on Dec. 20, 2006, the content of which is hereby incorporated by reference into this application.

BACKGROUND OF THE INVENTION

The present invention relates to an optical pickup and an optical information reproduction system.

One of prior arts related to the technical field of the present invention is disclosed, for example, in JP-A No. 114165/2006. In this Publication, there is such a description that "A detector plane exclusive to radio-frequency (RF) signals is provided to improve an S/N ratio using band synthesis with a signal from another detector plane. A diffraction grating is used for light beam splitting to remarkably relax an adjustment accuracy requirement. An alternating-current (AC) amplifier can be employed as an RF signal photocurrent amplifier.".

SUMMARY OF THE INVENTION

In these years, an optical information reproduction system for information media typified by optical disks has been required to reproduce information recorded at a higher density in the medium at a higher speed. As a result of the requirement, marks of sizes of about 0.3 μm recorded using a red beam (of 650 to 785 nm) in the prior art are being replaced by marks of sizes of 0.17 μm or smaller recorded using a blue beam (of about 405 nm) with an increased density. However, a tolerance for light power density on the medium is almost unchanged although the surface area of the mark is made smaller, which necessarily leads to the fact that the amount of light obtained in a readout mode becomes correspondingly less. Further, as the readout speed is increased, the detection time is shortened and the amount of detected light per mark also becomes less correspondingly.

For the aforementioned reason, such an optical information reproduction system that is increased in density and speed especially using the blue beam, has problems that since the amount of detected signal light is becoming less, a signal/noise (S/N) ratio is becoming smaller when the detected light is converted to an electric signal, a reproduction data error caused by the noise is increased, and then a reliability is becoming low.

For the purpose of solving those problems, for example, such an information reproduction apparatus as disclosed in JP-A No. 114165/2006 is proposed. In the Publication, as shown in FIG. 2, a method of providing a detector plane exclusive to a readout signal (RF signal), dividing a light beam using a diffraction grating into sub-beams for a detector plane for detecting a servo signal and for the detector plane exclusive to the RF signal, converting RF signal light detected at the RF-signal specific detector plane into an electric signal, and then amplifying the converted electric signal using an exclusive photoamplifier (photo-electron signal amplifier) is employed. In that time, an RF signal obtained from the servo signal detecting plane and the RF signal obtained from the exclusive detector plane are synthesized with respect to their frequency ranges using a frequency filter. An AC amplifier having less noise may be used as the RF-signal exclusive photoamplifier so that a readout signal of the RF with less noise is obtained compared with a readout signal obtained from a prior art system for amplifying and then adding a signal from a multi-division detector plane. As a result, an information reproduction apparatus capable of reading information with an increased speed and increasing a reliability can be arranged. Further, in order to obtain a good combined RF signal upon the band synthesis, a technique for matching the sensitivities of two RF signals is also shown. Hereafter we define that the RF signal is a signal proportional to total amount of reflected light from an information recording medium. We also refer the signal which part of the frequency range is extracted from the signal proportional to the whole quantity of light. Further, we even refer the RF signal detector with detector planes (light receiving planes) divided into regions, such as a four-quadrant photodetector, which can detect a signal equivalent to the RF signal by adding the signals from the divided regions of the detector planes together.

In the above prior art arrangement, however, when it is desired to read out information at an additionally increased speed, it has been demanded to improve respects (1) to (4) which follow.

(1) In the prior art arrangement, when the type of a medium changes the wavelength of a light source is changed, and the difference in wavelength sensitivity characteristic between the two detector planes, one of which is for the servo signal detection and another is for the RF signal, (the photocurrent sensitivity being dependent on the wavelength) causes a difference in sensitivity between the signals. This results in that two RF signals cannot be canceled each other at low frequencies and therefore the band-synthesized RF signal is distorted in some cases. Further, upon reproduction of information at higher speeds, a difference in delay time between circuits caused by component variations such as wiring length or amplifier delay time (group delay characteristics to frequency) causes a time difference between the two RF signals. Due to that, the RF signal after the two RF signal synthesis was distorted in some cases.

(2) In the prior art arrangement, the detector plane is arranged to be easily integrated on an opto-electronic integrated circuit (OEIC). However, when RF-signal exclusive detector planes are arranged side by side to be directly next to the servo signal detector plane as in the prior art arrangement, reflected light from another layer is defocused and overlapped with other beams, with the result that the signal is fluctuated by multilayer interference and a resultant signal is distorted. Further, since the ground GND is commonly used on the same OEIC chip board, crosstalk caused by a GND potential fluctuation becomes noise and mingled into the RF signal of the exclusive detector plane, thus resulting in that a resultant signal is distorted in some cases.

(3) In the prior art arrangement, upon the band synthesis, a gain automatic controller (learning function) for coping with a variation in the sensitivity of the pickup (including a lot variation and variations in the performances of individual components such as sensitivity/frequency dependency) or a circuit for signal switching according to the speed rate is required, thus involving its increased cost.

(4) In a higher speed mode, a readout signal less noise is required for decoding compared to lower speed mode. When the synthesized RF signal is used, however, its jitter is, in some cases, more deteriorated than when the RF signal from the exclusive detector plane is used directly for the decoding. (When the RF signal of the exclusive detector plane is used as it is in the decoding, a better jitter is obtained.)

As mentioned in the above respects (1) to (4), in spite of the fact of provision of the RF-signal exclusive detector plane, the prior art has a problem that its S/N ratio performance is not improved sufficiently. In addition, the prior art has another problem that the pickup provided for such S/N ratio improvement becomes costly.

It is therefore an objective of the present invention to provide an optical pickup and an optical information reproduction system having a good S/N ratio.

The above objective is attained, as an example, by time adjusting and synthesizing first and second RF signals.

In accordance with an advantage of the present invention, there is provided an optical pickup and an optical information reproduction system by which a good S/N ratio can be provided.

DETAILED DESCRIPTION OF INVENTION

The present invention will be explained in connection with embodiments of the invention, and the aforementioned problems can be solved by techniques or functions (1) to (4) which follow.

(1) A delay time controller is provided for either one of two RF signals.

(2) An RF-signal exclusive light receiver is provided to be isolated from an OEIC chip independently thereof. In addition, the size of the RF-signal exclusive detector plane is set to be smaller than the size of an OEIC detector plane. To this end, semi-reflecting mirror is used for beam splitting.

(3) A memory device (such as an EEP-ROM) is mounted on a pickup, and a gain controller for enabling gain adjustment in a band synthesis mode according to information in the memory is provided.

(4) A selector for turning OFF band synthesis according to a speed rate is provided.

When the above functions (1), (2), (3), and (4) are combined, there is obtained a reliable optical information reproduction system which can reproduce information with a good noise performance in a speed range from a low speed to a high speed.

Specific embodiments of the present invention will be explained by referring to FIGS. 1 to 17.

Embodiment 1

An example of an arrangement of an information reproduction system having a variable delay time controller in accordance with the present embodiment will be explained with reference to FIGS. 1 to 13. In this example, the word 'variable' means to include stepwise switching of a sensitivity or a delay time.

Explanation will first be made as to an information reproduction apparatus comprising an exclusive RF signal detector plane and the effects of the apparatus, by referring to FIGS. 2 to 6. In this example, explanation will be made as to common effects shared by the prior art arrangement of FIG. 2 and by the invention arrangements of FIG. 1, FIG. 7 and subsequent drawings, first by referring to the prior art arrangement.

Figure 2:
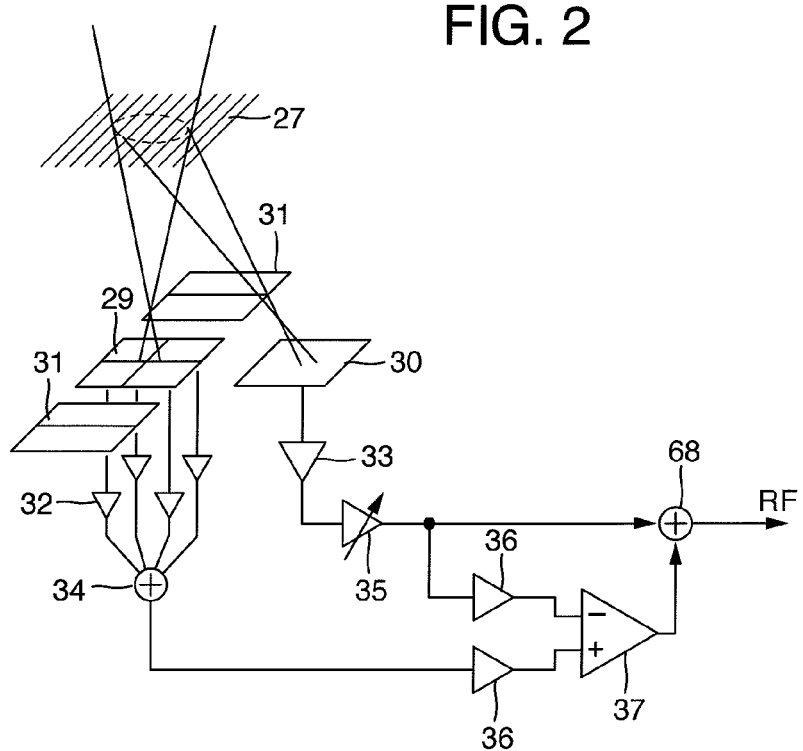
FIG. 2 shows an example of arrangements of a light receiving optical system and a signal amplification circuit in the prior art.

FIG. 2 is an example of connection between detector planes on a light receiving element or photodetector for detection of a tracking (TR) signal based on a differential push-pull method as one of 3-spot methods and photocurrent amplifiers provided in the vicinity thereof. A beam directed from a laser light source to an information recording medium is subjected to light quantity modulation according to information recorded on a recording film, and reflected by the information recording medium as a reflected beam. The light flux of the reflected beam is converged by a detection lens and enters the optical system. Ones three sub-spots at both ends are detected by each pair of sub-spot detector planes 31. The remaining center spot is split by a diffraction grating 27 provided in front of a photodetector into sub-spots, which in turn are directed to a central four-quadrant photodetector 29 and also to an RF signal detector plane 30. More specifically a zero-order light beam passed through the diffraction grating 27 is directed to the four-quadrant photodetector 29. A first-order light beam diffracted by the diffraction grating 27 is directed to the RF signal detector plane 30. Photocurrents of the beam splits detected by four regions of the four-quadrant photodetector 29 are amplified by respective DC photocurrent amplifiers 32, and output to generate a focus error detection signal (AF signal) and a tracking error detection signal (TR signal). A photocurrent of the beam detected by the RF signal detector is amplified by an RF signal photocurrent amplifier 33 and then output. The TR signal is generated by the differential push-pull method on the basis of a difference in detected light quantity between the four-quadrant photodetector 29 and the split detector planes of the sub-spot detector planes 31.

Figure 3:
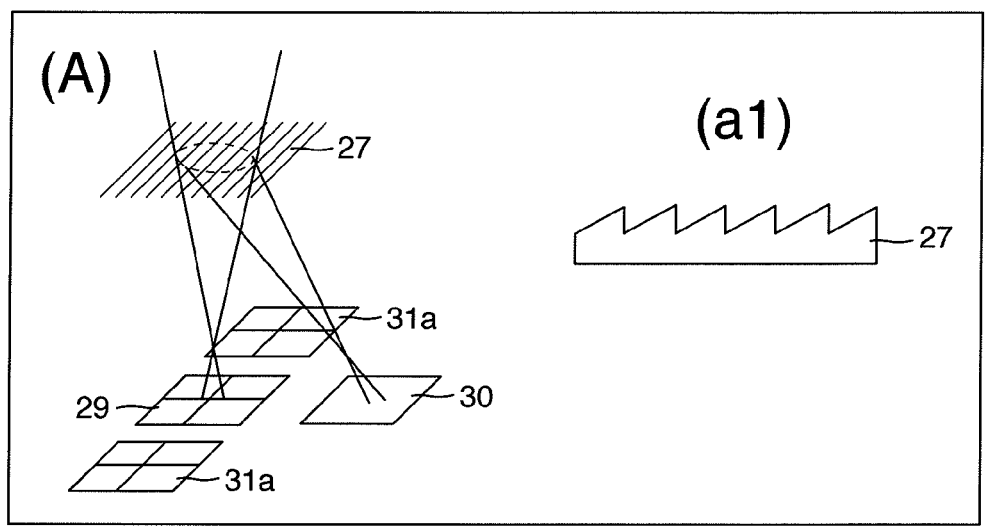
FIG. 3 shows an example of a detector plane based on a differential astigmatism method.

In the present optical system, a readout signal for the center spot is split by the diffraction grating. As the diffraction grating, such a blaze type diffraction grating having a saw-toothed section shape as shown in (a1) of FIG. 3 is used to provide diffraction only on one side.

Since the use of the present arrangement causes the RF signal to be obtained by the exclusive detector plane, the RF signal having noise less than when the RF signal is obtained by adding four signals from the DC photocurrent amplifiers, can be obtained. More specifically, when the number of detector planes are increased in order to obtain the same signal, it is required to correspondingly increase the number of amplifiers, thus resulting in that noise becomes higher by an amount corresponding to an addition of noise signals generated by the respective amplifiers. With the present arrangement, since the beam splitting is replaced with a single detector plane for the RF signal, requiring a single photocurrent amplifier. Even when the same DC amplifier as the DC photocurrent amplifiers 32 as the RF signal photocurrent amplifier 33 is employed, the number of necessary amplifiers generating noise can be decreased and thus the noise of the amplifier can be correspondingly reduced by 6 dB. When two beams are obtained by equally splitting by the diffraction grating so as each to have 50% of the light quantity, half reduction of the light quantity of the signal causes 3 dB deterioration of the S/N ratio, but the total S/N ratio is improved by 3 dB (=6 dB−3 dB).

With the present arrangement of the optical system, further, even an AC amplifier is used as the RF signal photocurrent amplifier, the focus position and the tracking can be controlled according to signals from the servo four-quadrant photodetector. For this reason, in place of the DC amplifier, an AC amplifier having lesser noise can be used. Since the AC amplifier eliminates the need for a differential amplifier, base noise can be reduced by 6 dB. As a result, noise can be reduced further by 6 dB in addition to the aforementioned 3 dB of the S/N ratio, and thus eventually can be reduced by a total of 9 dB (=3 dB+6 dB). When an AC amplifier is used, a compound semiconductor (GaAs or the like) transistor having less noise can be used as an amplification transistor. Thus, noise can be further reduced (typically, by 10 dB or more) and the S/N ratio can be further improved in total.

Such a combination of the optical system and the circuit enables the optical signal to be amplified with minimized noise generation. In this connection, not only the aforementioned differential push-pull method but also a differential astigmatism method can be similarly employed with use of such a detector plane as shown in (A) of FIG. 3.

Figure 4:
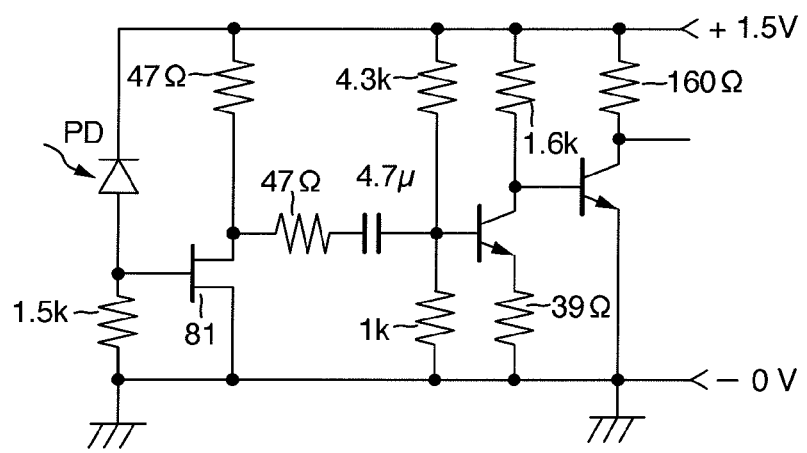
FIG. 4 shows, as an example, a configuration of a circuit of an AC amplifier using a compound semiconductor transistor.
Figure 5A:
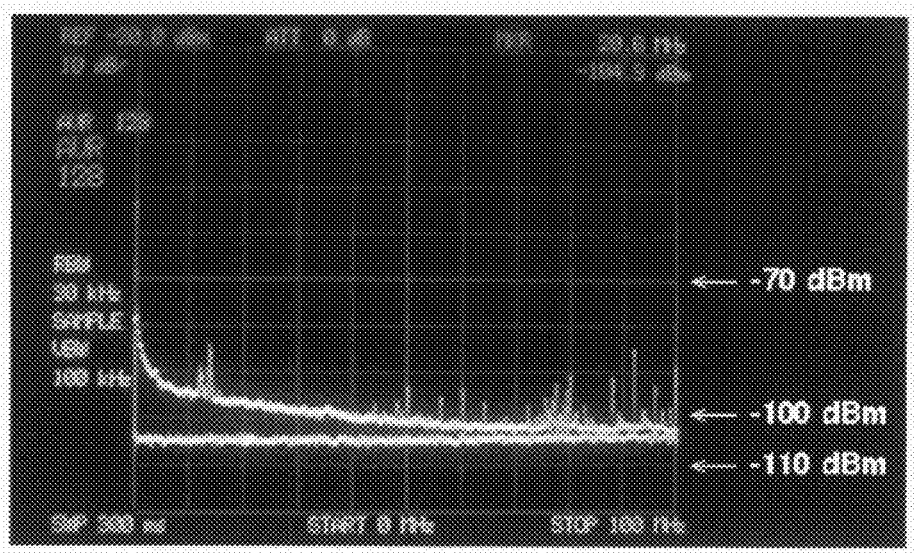
FIG. 5A is an example of a difference in actual noise characteristic (frequency plot) between AC and direct-current (DC) amplifiers.
Figure 5B:
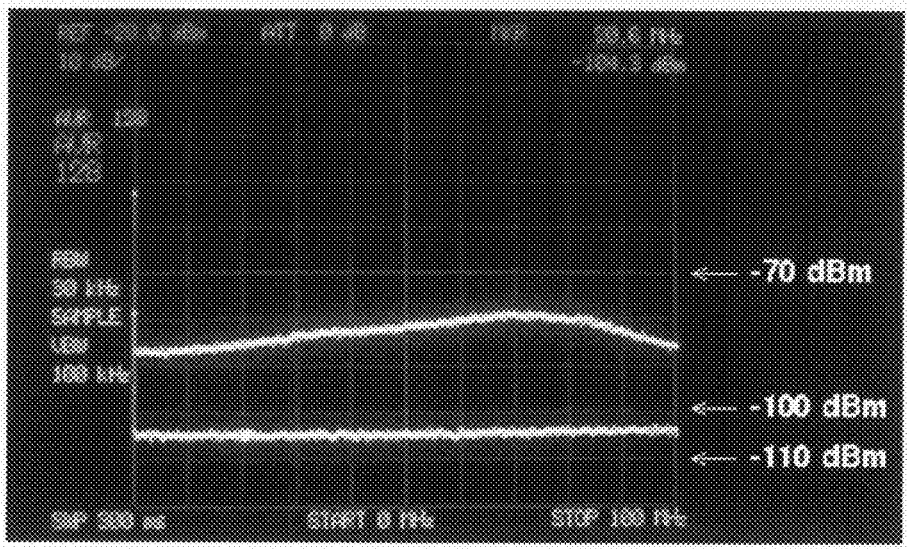
FIG. 5B is another example of the difference in actual noise characteristic (frequency plot) between the AC and DC amplifiers.

In general, a differential amplifier such as an operational amplifier made of Si as a material is used as the DC photocurrent amplifier 32, and its typical reproduction signal has such a noise spectrum as shown in FIG. 5B (amplification degree: resistance conversion R=80 kΩ). In the drawing, abscissa denotes frequency in a range of 0 to 100 MHz/div), and ordinate denotes the noise intensity of an amplifier in a range of −120 dBm to −20 dBm. The plot line near −105 dBm shows the noise measurement limit of this measuring device. In this amplifier, uniform noise on the order of −80 dBm takes place over a wide range (of 0 to 100 MHz). In contrast, when such a compound (GaAs or the like) semiconductor field effect transistor (MES-FET: Metal-Semiconductor Field-Effect Transistor) as shown in FIG. 4 is used as an AC photocurrent amplifier (RF signal photocurrent amplifier), its reproduction signal has such a noise spectrum as shown in FIG. 5A (amplification degree: resistance conversion R=200 kΩ). In the drawing, abscissa and ordinate denote factors same with the above case. It will be seen from the plot that rather large noise takes place in the vicinity of 0 Hz (DC) (1/f noise), but noise is less than when the DC photocurrent amplifier when frequency is higher than 4 MHz, and overall noise is as small as 10-20 dB, in particular, when frequency is higher than 20 MHz, even though the sensitivity (amplification degree) of the photocurrent amplifier of FIG. 5A is twice higher than the amplifier of FIG. 5B. Thus, when the two amplifiers are compared for the same sensitivity, the noise of the amplifier of FIG. 5A is much smaller.

Figure 6A:
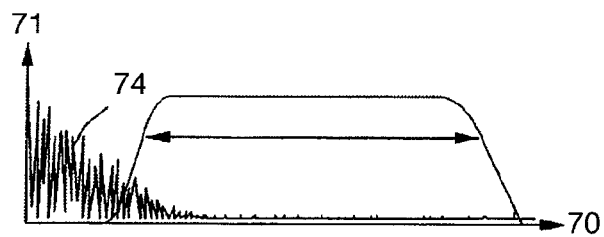
FIG. 6A is a diagram for explaining a principle of reducing noise by synthesizing RF signals in the present embodiment.
Figure 6B:
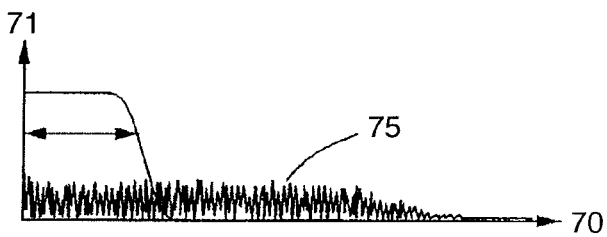
FIG. 6B is another diagram for explaining the principle.
Figure 6C:
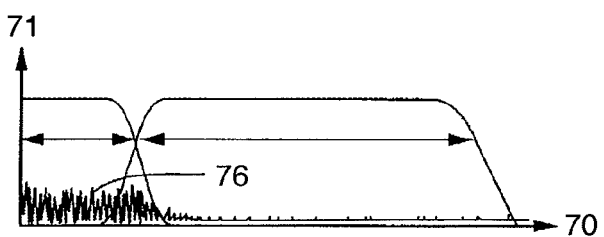
FIG. 6C is a further diagram for explaining the principle.

From the above consideration, when the signal of the prior art DC photocurrent amplifier is used in a frequency range lower than, e.g., 4 MHz (see FIG. 6B), the signal of the RF-signal photocurrent amplifier is used in a range higher than 4 MHz (see FIG. 6A), and these signals are band-synthesized, as shown in FIGS. 6A to 6C; a signal having small noise in total can be obtained (see FIG. 6C). With such an arrangement, a DC (0 Hz) component in the signal from the high-frequency-range amplifier can be removed, and an AC amplifier having noise lower than the DC amplifier can be used as the RF signal photocurrent amplifier 33. In the drawings, reference numeral 70 denotes frequency in abscissa, numeral 71 denotes signal intensity in ordinate, 74 denotes a noise intensity distribution of the RF signal photocurrent amplifier (first RF signal), 75 denotes a noise intensity distribution of the DC photocurrent amplifier (second RF signal), and 76 denotes a noise intensity distribution of a combined RF signal after the first and second signals are band-synthesized. This principle is shown in JP-A No. 114165/2006.

However, when the above system is employed, for example, for a pickup in an optical disk apparatus which can accept various sorts of media, that is, can be compatible with diverse schemes/standards; different media have different reflectivities. Thus, for the purpose of obtaining an optimum readout signal, it is required to select one of sensitivities of the photocurrent amplifiers according to the type of the medium and to the selection of record/replay and speed rate. Further, when the apparatus is used not only for reproduction but also for recording information, it is required to change the sensitivity with switching between reproduce and record modes. With the sensitivity change, the internal circuits of the amplifiers (RF signal photocurrent amplifier 33 and DC photocurrent amplifiers 32) are switched. Thus the gains of these amplifiers are mismatched in some cases, hence difference in the amplifier gains. Switching between these circuits also causes a change in delay time difference between the two RF signals. It has been found that mismatch between the gains or the delay time differences involve a problem that the synthesized signal after the RF signals is distorted and thus accurate decoding is disabled in some cases especially at higher speeds.

Figure 7A:
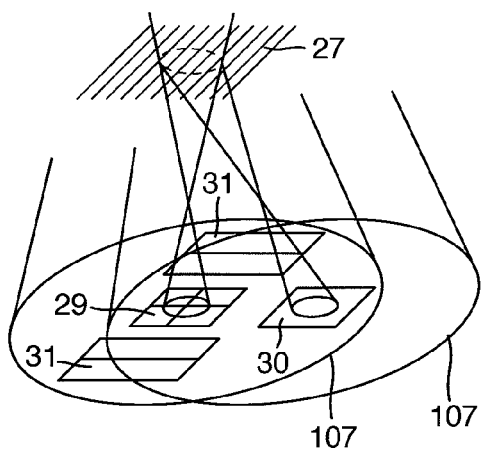
FIG. 7A shows an example of multilayer reflected beams on a detector plane when reading multilayered disk in the prior art.

It has been also found as another problem in the arrangement of the prior art optical system of FIG. 2 that, when a multilayer disk is used, unnecessary multilayer-reflected light 107 from other layers, in addition to a beam on the recording layer in a readout mode, defocused and spread on the detector plane to be overlapped therewith as shown in FIG. 7A, which results in that the unnecessary light mingles with the beam of the recording layer (multilayer interference)

in the readout, thus generating interference fringes and disturbing the signal. In particular, when such an arrangement of detecting a focus error based on the astigmatism method as shown in FIG. 7A is employed, the beam split by the diffraction grating requires the size of the RF signal detector plane 30 to be set to nearly the same with the size of the four-quadrant photodetector 29. For this reason, it has been found that the prior art has the above problem that the multilayer reflected light 107 are received as unwanted light on the wide area and the signal is correspondingly largely disturbed. In addition, it has been found that the prior art has a further problem that, when the four-quadrant photodetector 29 and the DC photocurrent amplifiers 32 are combined into an OEIC, mounting of the RF signal detector plane 30 on the same chip substrate causes the GND potential to be varied by an amplifier in the OEIC at the time of outputting a very weak photocurrent signal to the RF signal photocurrent amplifier separated from the OEIC chip, with the result that the GND potential variation causes crosstalk noise and signal mixing.

It has also been found at higher speed that, since a signal bandwidth required for decoding medium recorded information is shifted to a higher frequency side, the band synthesis becomes unnecessary depending on the speed, so that, instead of it, when the signal of the exclusive RF signal detector plane 30 is used directly for decoding, a better jitter is obtained.

Explanation will be directed to, as an example, a light receiving optical system and an arrangement of a circuit in the vicinity thereof in an improved information reproduction apparatus which can solve the above problems, be compatible with many media of different schemes/standards, and reproduce information at higher speeds.

Figure 1:
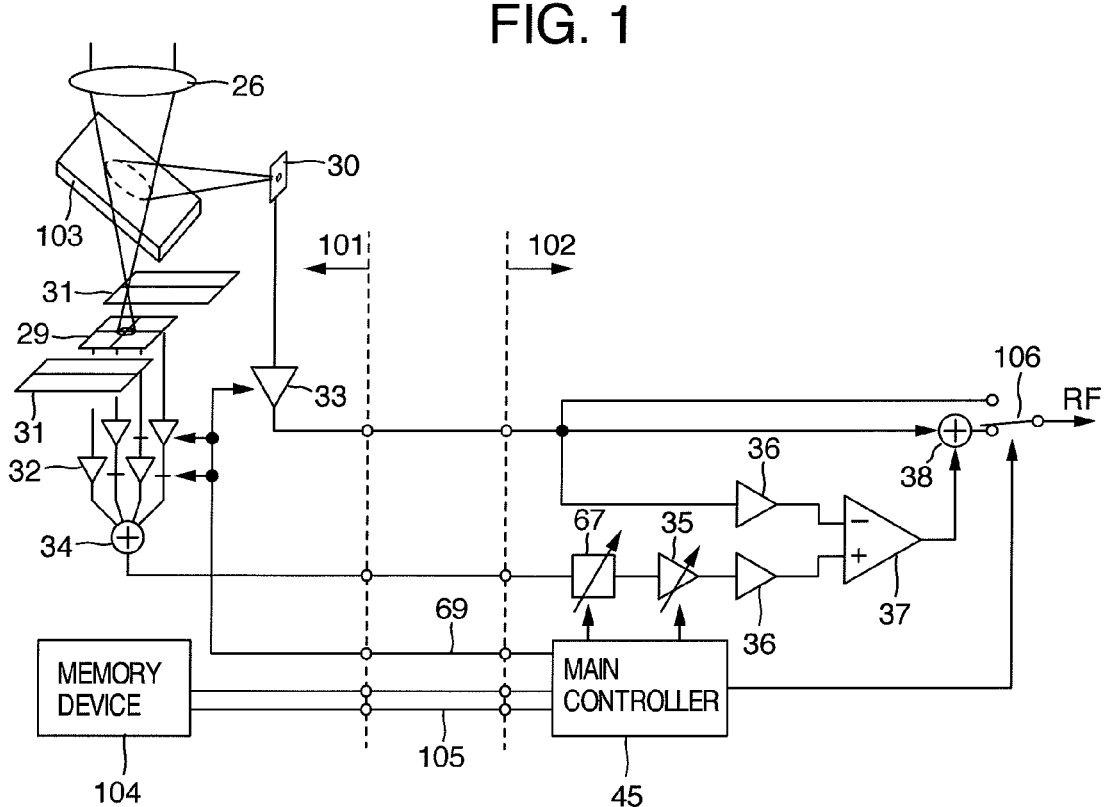
FIG. 1 shows an example of arrangements of a light receiving optical system and a signal amplification circuit in an embodiment of the present invention.

FIG. 1 shows an example of interconnection among an optical system having a detector plane for detecting a TR signal according to the differential push-pull method and amplifiers and combination/control circuits, including a variable delay time controller, a variable sensitivity or gain controller, and a selector based on a band synthesis method in the vicinity of the optical system in accordance with an embodiment of the present invention. FIG. 1 corresponds to only part of the entire arrangement of an information reproduction apparatus of FIG. 12 to be explained later.

A single four-quadrant photodetector 29 in the middle of a photodetector and two sub-spot detector planes 31 at both sides thereof corresponding to 3 spots are located on the photodetector. An RF signal detector plane 30 provided independently of the above detector planes is located vertically to the detector planes (to a plane including the four-quadrant photodetector 29 and the sub-spot detector planes 31) of the photodetector.

Light incident to the light receiving optical system is first condensed by a detection lens 26, and then split by a semi-reflecting mirror 103 into optical paths to the photodetector and to the RF signal detector plane 30. The semi-reflecting mirror 103 is tilted at angle of about 45 degrees with respect to the optical axis of the system so that the incident light is reflected at a right angle by the semi-reflecting mirror 103. Although only the optical path of central one of the 3 spots is illustrated in FIG. 1, the 3 spots on the respective detector planes are detected on a spot-by-spot basis in actual cases. The center spot is detected by the four-quadrant photodetector 29, and the sub-spots are detected by a sub-spot detector planes 31. The light reflected by the semi-reflecting mirror 103 is detected by the RF signal detector plane 30, and then amplified by an RF signal photocurrent amplifier 33 to generate a first RF signal (readout signal). Meanwhile, signals from 4 divisions of the four-quadrant photodetector 29 are amplified by respective DC photocurrent amplifiers 32 and added together at an adder 34 to generate a readout signal, which is used as a second RF signal (readout signal). The second RF signal is passed through a delay time controller 67 for correcting a time difference between the first and second RF signals and through a gain controller 35 for correcting a sensitivity or gain difference. The first and second RF signals are then reconstructed or band-synthesized (with respect to frequencies) by low-pass filters 36, a subtractor 37, and an adder 38. The RF signal to be eventually output from the apparatus is determined by a readout signal selector 106 which selects one of the band-synthesized RF signal and the first RF signal before the band-synthesis. A memory device 104 as a nonvolatile memory element is mounted in the side of a movable pickup 101, so that information stored in the memory device 104 can be read out from a fixed circuit board 102 via a memory access line 105. The delay time of the delay time controller 67 and the gain of the gain controller 35 are arranged to be adjusted under control of a main controller 45 respectively.

Figure 12:
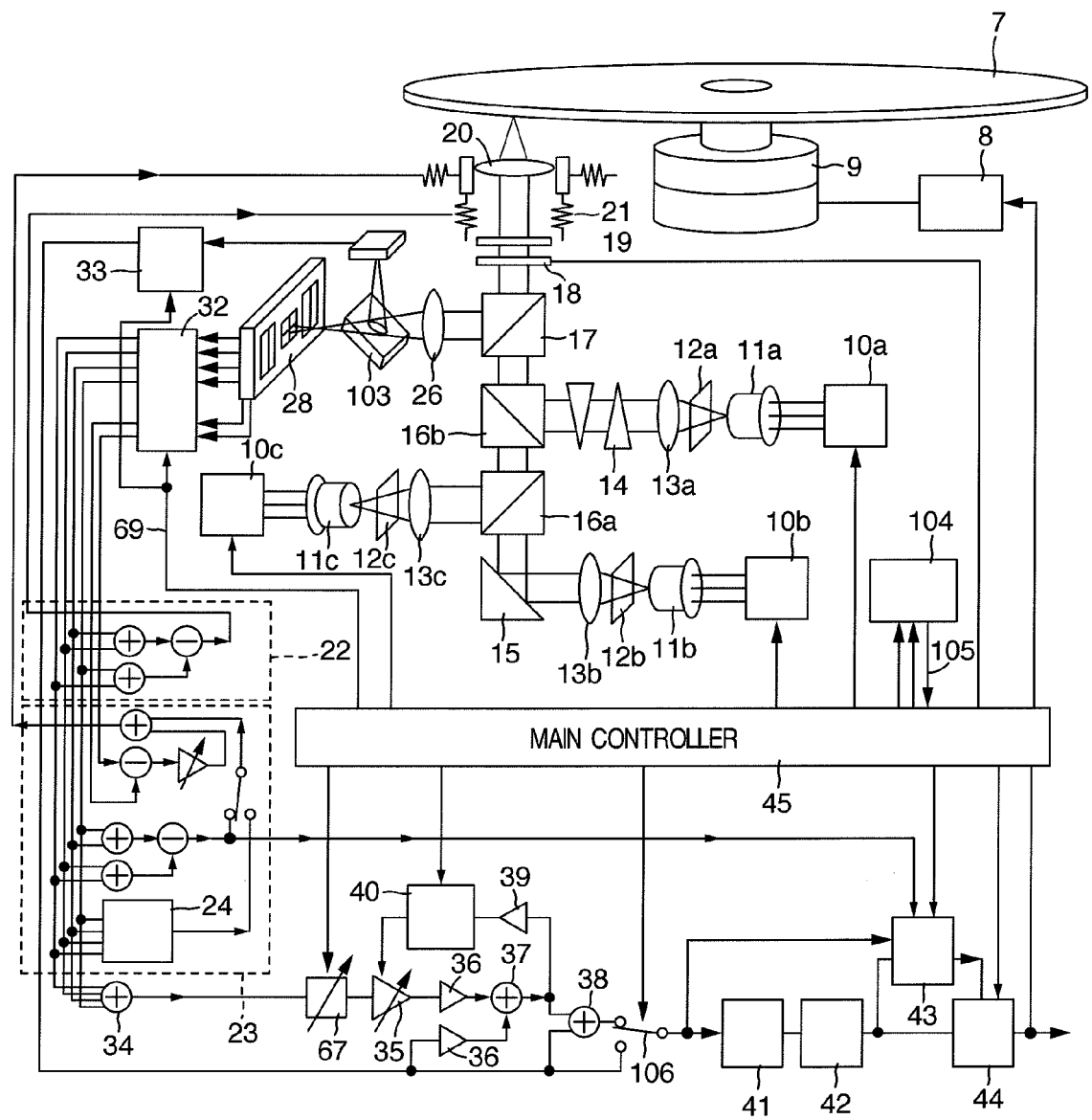
FIG. 12 shows an example of an overall arrangement of an information reproduction system in accordance with the present embodiment.

FIG. 12 shows the entire arrangement of an information reproduction apparatus including the light receiving system and the circuit in the vicinity thereof in FIG. 1.

An optical disk 7 as a recording medium is mounted on a spindle motor 9, which rotational speed is controlled by a spindle motor controller 8. The medium is illuminated with beams from semiconductor lasers 11a, 11b, and 11c driven by laser drivers 10a, 10b, and 10c. The semiconductor lasers 11a, 11b, and 11c have each different wavelengths. A blue semiconductor laser is used as the semiconductor laser 11a, a red semiconductor laser is used as the semiconductor laser 11b, and an infrared semiconductor laser is used as the semiconductor laser 11c. The beams emitted from the semiconductor lasers 11a, 11b, and 11c are passed through respective diffraction gratings 12a, 12b, and 12c based on the 3-spot method, and then passed through respective collimating lenses 13a, 13b, and 13c. Only the beam from the blue semiconductor laser is further passed through a beam shaping prism 14.

The beam from the semiconductor laser 11c is changed in its direction, i.e. reflected by a reflector 15, and is directed toward the disk 7. The beam from the semiconductor laser 11b is changed in its direction by a combination prism 16a, combined with the beam from the semiconductor laser 11c, and then directed toward the disk 7. The beam from the semiconductor laser 11a changes in its direction by a combination prism 16b, combined with the beams from the semiconductor lasers 11b and 11c, and then directed toward the disk 7. The respective laser beams are passed through a polarizing beam splitter 17, a liquid crystal wavefront corrector 18, and a quarter-wave plate 19; and then condensed and applied on the disk 7 by an objective lens 20.

The objective lens 20 is mounted on an actuator 21 so that the focus position of the lens can be changed in a focus direction according to a signal from a focus servo driver 22 and in a track direction according to a tracking servo driver 23. At this time, a substrate thickness error of the optical disk 7 and an aberration generated by the objective lens 20 are corrected by the liquid crystal wavefront corrector 18. Through the aberration correction, the condensed or focused beam spot can be converged to be sufficiently small. With use of such a converged beam, a fine mark pattern recorded on the disk 7 can be read out or a mark pattern can be recorded on the disk. Part of the beam applied on the disk 7 is reflected by the disk; passed again through the objective lens 20, the quarter-wave plate 19, and the liquid crystal wavefront corrector 18; and then reflected by the polarizing beam splitter 17 in a direction toward the detection lens 26. The reflected beam is passed through the detection lens 26 and split by the semi-reflecting mirror 103. A beam reflected by the semi-reflecting mirror 103 is detected by the RF signal detector plane 30 and converted into an electric signal. The electric signal is amplified by the RF signal photocurrent amplifier 33 to generate a first readout signal (RF signal). The gain of the RF signal photocurrent amplifier 33 is selectively switched according to a voltage on a gain switching signal line 69. The semi-reflecting mirror 103 is arranged so that the traveling direction of the reflected beam is directed to a diagonal direction of the square of the four divisions of the four-quadrant photodetector 29 (in other words, to a direction of an angle of 45 degrees with respect to a cruciform section of the square detector). The voltage on the gain switching signal line 69 varies with the type or replay speed of the medium or with switching between replay and record modes, and the gain of the photocurrent amplifier is also correspondingly switched.

Meanwhile, a beam passed through the semi-reflecting mirror 103 is subjected to an astigmatism action during passage of the glass of the semi-reflecting mirror, received at the four-quadrant photodetector on a photodetector chip 28, and then converted to electric signals. The electric signals are amplified by the DC photocurrent amplifiers 32, and added together and/or subtracted each other, so that a focus error signal is generated in the focus servo driver 22, a tracking error signal is generated in the tracking servo driver 23, and a second readout signal (RF signal) is generated in the adder 34. Due to provision of a differential phase detector 24, the apparatus can cope with the tracking control of a read-only medium. The gain of the signal from the DC photocurrent amplifiers 32 is also switched according to the voltage on the gain switching signal line 69. The gain is switched depending on the type or replay speed of the medium or on the switching between replay and record modes. As for the arrangement of the detector plane on the photodetector chip 28, such an arrangement for detection of a differential astigmatism as shown in FIG. 3 may also be employed, instead of the arrangement shown in FIG. 1. A memory device 104 as a nonvolatile memory element is mounted in the side of the movable pickup 101 so that information stored in the memory can be read out from the fixed circuit board 102 via the memory access line 105.

The second readout signal is passed through the delay time controller 67 and the gain controller 35, passed through the low-pass filter 36, and then supplied to one input of the subtractor 37. Meanwhile, the first readout signal is passed through the other low-pass filter 36, supplied to the other input of the subtractor 37, and also supplied to the adder 38. The subtractor 37 generates a differential signal corresponding to a difference between those input signals and supplies the differential signal to the adder 38 and also to a high-pass filter 39. The high-pass filter generates a signal corresponding to the differential signal but having its frequency components in the vicinity of DC removed, and supplies it to a gain controller 40 in which an amplitude detector is equipped. The gain controller 40 controllably minimizes the amplitude of the differential signal by changing a voltage to be output to the gain controller 35 according to the detected differential signal. An initial value for the gain is read out from the memory device 104. The gain controller 40 may control the gain variably depending on the switching of the light source wavelength or on the condition of the apparatus under control of an instruction from the main controller 45. The delay time controller 67 adjusts a delay time according to an instruction from the main controller 45. The adder 38 generates a sum signal corresponding to a sum of the differential signal and the first readout signal. The sum signal is used as a band-synthesized readout signal i.e. combined RF. The readout signal selector 106 selects the use of the combined RF signal as the RF signal for use in the subsequent decoding operation or the use of the first readout signal as it is.

The readout signal selected by the readout signal selector 106 is sent via an equalizer 41, a level detector 42, and a synchronous clock generator 43 to a decoder 44, and converted at the decoder to an original recorded digital signal. The synchronous clock generator 43 directly detects the combined, i.e. band-synthesized readout signal and sends the clock to the decoder 44 at the same time. Such a series of circuits are integrally controlled by the main controller 45.

The optical system and circuits arranged in such a manner can improve mainly 4 respects (1) to (4) which follow over the prior art optical system of FIG. 2.

(1) In addition to the gain controller 35, the delay time controller 67 is added. As a result, the gain and the delay time can be adjusted. The gain is switched according to the type or playback speed of a medium, and the delay time is switched according to the gain. When the gains (sensitivities) of the RF signal photocurrent amplifier 33 and the DC photocurrent amplifiers 32 are switched, change of the delay time is caused. To avoid that, correction is carried out by canceling the delay time difference between the two RF signals. Since both of the gain and the delay time difference are made to coincide with those before the bandwidth-combine as accurately as possible, a distortion in the RF signal generated after the band synthesis can be remarkably reduced. Since a time lag (time difference) between the signals from the two RF signal detectors is canceled, a good combined signal is obtained. With it, accurate decoding can be achieved especially in high speed mode in which the delay time difference causes increased errors.

In order to realize the above, the movable pickup 101 and the fixed circuit board 102 are interconnected by the gain switching signal line 69 to switch the sensitivity (gain) and also to switch the sensitivity of the gain controller 35 and the delay time of the delay time controller 67.

Figure 8:
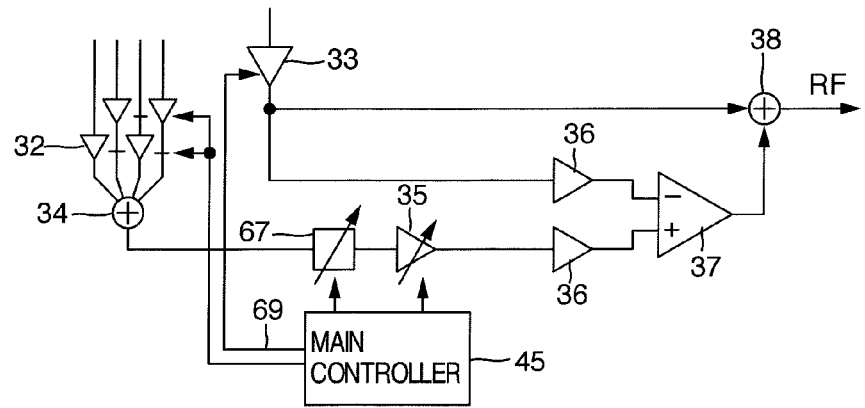
FIG. 8 is an example (1) of a configuration of a band synthesis circuit subjected to gain switching.
Figure 9:
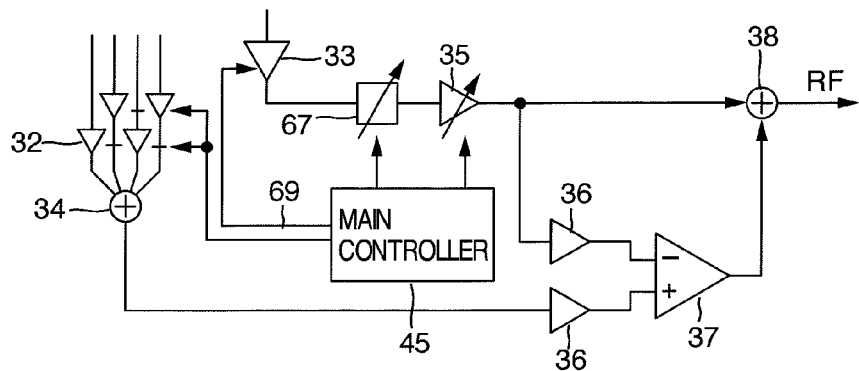
FIG. 9 is another example (2) of the band synthesis circuit subjected to the gain switching.

With respect to the improvement (1), additionally, when it is desired to insert the delay time variable controller (delay time controller 67) before the band synthesis, the controller may be inserted in either of the two RF signal lines. In the arrangement of FIG. 1, the gain controller 35 and the delay time controller 67 are provided on a signal line of the second RF signal as shown in FIG. 8. However, those controllers may be provided on the signal line of the first RF signal as shown in FIG. 9, so long as the relative gain difference or time difference between the two RF signals can be corrected. Since the correction of the delay time before the band synthesis enables elimination of the time difference between the two RF signals, the signal after the band synthesis can be prevented from being distorted. When these controllers are provided on the first RF signal line, combination of the signals is carried out with the gain of the second RF signal having a high stability as a reference. Thus the gain of the combined readout signal can advantageously have a constant level and be stable. Meanwhile, when these controllers are provided on the second RF signal line, even generation of noise in the gain controller 35 and the delay time controller 67 enables most of noise on the first RF signal line to be cut off by the low-pass filter 36. As a result, the combined readout signal can advantageously have a good S/N ratio.

Since the sensitivity (gain) and the delay time are switched according to the type or replay speed of each medium, a combined readout signal having less noise can be obtained under conditions optimum for each medium or playback speed. Even when the apparatus is used for recording information, the sensitivity (gain) and the delay time are switched according to the playback and recording modes. As a result, recorded data and address signals to be synchronized in the recording mode can be accurately obtained and accurate synchronization can be achieved in response to a change in the quantity, or power, of laser beam applied in the record mode or in response to a change in the reflectivity of the medium being recorded.

That is, the present arrangement of the invention includes a light source for illuminating a recording medium with light, a servo signal detector for obtaining a position error signal for the focus position of the objective lens relative to the medium on the basis of a difference in light quantity between beams of the reflected light, and an RF signal detector having a detector plane located independently of the servo signal detector for detecting a recorded signal from the reflected light. The combined readout signal is generated by band-synthesizing of the first RF signal obtained from the RF signal detector and the bandwidth of the second RF signal obtained from the servo signal detector. At this time, since the delay time variable controller (delay time controller 67) is inserted in the signal line of one of the two RF signals before the band synthesis and the delay time variable controller for adjusting the delay time difference between the first and second RF signals to adjust the delay time, the information reproduction apparatus is implemented to produce a combined readout signal less distorted even in high speed mode and can have a high reliability with a small error in the decoding.

For the purpose of achieving accurate correction, the delay time of the delay time controller is switched together with the gain according to the type of the recording medium and to the playback speed. As a result, the delay time difference between the two RF signals caused by the switching of the circuit in the photocurrent amplifier can be corrected according to the speed rate, an accurate combined readout signal can be obtained even at higher speeds, and the decoding can be achieved with less error.

Figure 7B:
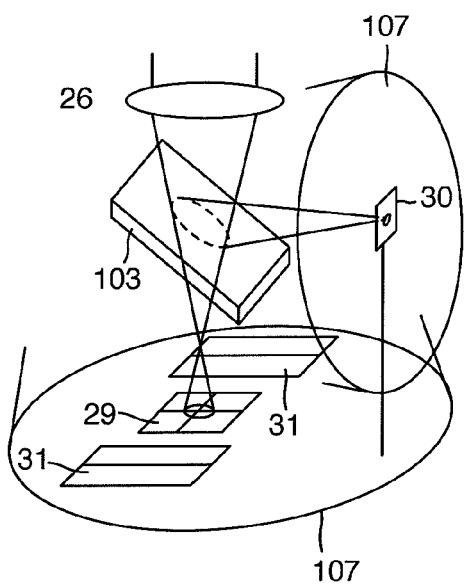
FIG. 7B shows an example of multilayer reflected beams on a detector plane when reading multilayered disk in the present invention.

(2) As shown in FIG. 7B, the exclusive RF signal detector plane is provided so that the semi-reflecting mirror 103 separates the optical path in the vertical direction and so that, when a multilayer medium is used, the unwanted multilayer reflected light 107 from other layers are not overlapped with the transmitted beam on the detector planes each other between the four-quadrant photodetector 29 and the RF signal detector plane 30. Since the glass of the semi-reflecting mirror 103 is set to have a thickness of about 1.5 to 3.0 mm to cause an astigmatism when light is passed through the glass, focus detection based on the astigmatism method by the four-quadrant photodetector 29 can be employed. As a result, the center spot when focused spreads up to about a half (up to 50 μm) of the four-quadrant photodetector 29. Meanwhile, since the light reflected by the semi-reflecting mirror 103 and directed toward the RF signal detector plane 30 generates no astigmatism and arrives at the detector plane, the spot of the reflected light on the detector plane when focused is converged down to about 5-10 μm almost ideally. As a result, the size of the detector plane can be made as small as a half of the four-quadrant photodetector 29 (FIG. 7B) size and the quantity of received multilayer reflected light 107 can be made small. Due to those two effects, an optical interference caused by light leaked from other layers when the multilayer medium is reproduced can be remarkably reduced and a signal caused by the unwanted multilayer light can be less disturbed. In other words, since the beam splitting is carried out with use of the semi-reflecting mirror 103, the difference between the two spots can be easily generated and the transmitted light can have an astigmatism and a spot having such a large size as to be suitable for focus detection at the focused position can be obtained, while the split reflected light has no astigmatism and converged into a small spot hence the small detector plane. As a result, a cylindrical lens for generation of an astigmatism (such as shown in FIG. 20 of JP-A No. 114165/2006) can advantageously eliminated. Further, when the photodetector 28 is made in the form of an OEIC, installation of the RF signal detector plane 30 electrically isolated independently of the OEIC chip enables reduction of crosstalk noise via the ground GND.

As the complementary explanation of the improvement (2), the size of the four-quadrant photodetector 29 as the detector plane of the center spot is set generally at about twice the diameter of the center spot when focused, and therefore the detector has a sufficient positional deviation margin which is about the same with the diameter of the center spot. When even the RF signal detector plane 30 has a sufficient positional deviation margin of about the same (0-50 μm) diameter of the detector, the positional deviation margin becomes the size of the detector plane because the spot is converged into nearly one point. In other words, when the astigmatism method is used as the focus error detection system, about a half of the size of the main detector plane can be achieved relatively easily as the size of the light receiving plane of the RF signal detector. The light detector plane for receiving the focused center spot in that example will be referred to as the main detector plane hereafter. In the example of that arrangement, the four-quadrant photodetector 29 corresponds to the main detector plane. As a result, when compared with the case of using such an arrangement as shown in FIG. 7A, the disturbance of a signal caused by the unwanted multilayer reflected light can be reduced to ¼ in surface area ratio and further reduced to a half because of no overlap with the unwanted light. Thus the signal disturbance can be reduced down to about ⅛ in total. In this way, even when a multilayer medium made of 3 or more layers is reproduced, the signal disturbance caused by the interference light can be sufficiently reduced.

That is, in the present arrangement; the light source for emitting light to a recording medium, the servo signal detector for obtaining a position error signal of the objective lens on the basis of the light quantity difference from the reflected light, and the RF signal detector having the light receiving plane located independently of the servo signal detector for detecting a record signal from the reflected light are provided. The RF signal detector is provided in the form of an element chip independently of the photodetector chip having the servo detector. And since the size of the light receiving plane of the RF signal detector is set to be smaller than the size of the main detector plane of the servo signal detector, the disturbance of the readout signal caused by the multilayer interference in the playback of the multilayer medium is suppressed to such an extent as not to cause a significant problem.

Figure 10:
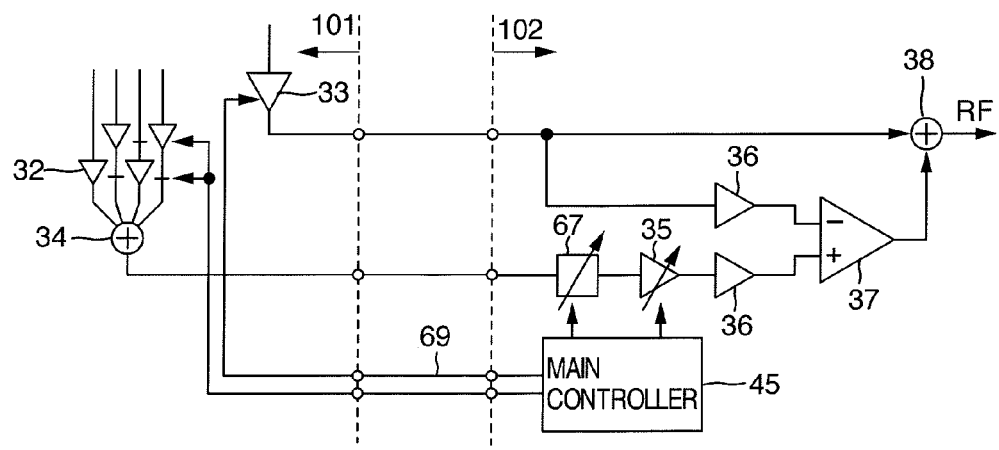
FIG. 10 is an example of an RF signal synthesis circuit when the circuit is mounted on a fixed circuit board in the present embodiment.

(3) As in FIG. 1, the memory device 104 is provided on the pickup 101 to correct a variation in the sensitivity of each amplifier of the pickup or a delay time variation for each sensitivity on the basis of information (values) about the memory device 104. More specifically, values of accurate gains (or corrections) of the amplifiers in the pickup upon switching the gains and/or variations in the delay time are previously stored in the memory device 104 mounted on the movable pickup 101 to be associated with the respective gains. The memory device 104 on the movable pickup 101 and the fixed circuit board 102 are interconnected by the memory access line 105 to read out the information in the memory device 104 and to switch between the sensitivities and between the delay times according to the type of the medium and to the recording/replaying mode and to the speed rate. In detail, the memory device 104 is an electrically erasable read-only memory, an EEP-ROM or the like. The information is read out under control of the main controller 45. On the basis of the read out information, the main controller 45 sets the gain of the gain controller 35 and the delay time of the delay time controller 67 according to the type of the medium and to the recording/replaying modes and speed rates. In FIG. 1, the band-synthesizer (corresponding to a circuit ranged from the delay time controller 67 to the adder 38) is provided in the side of the fixed circuit board 102 as in FIG. 10. However, the band-synthesizer may be provided on the movable pickup 101 to achieve band synthesis on the pickup as in FIG. 11. In the latter case, a correcting-gain switching signal line 108 and a delay time switching signal line 109 are provided between the movable pickup 101 and the fixed circuit board 102 to allow the main controller 45 to select the correcting gain of the gain controller 35 and the delay time of the delay time controller 67. In the case of FIG. 10, 2 channels of RF signals are independently transmitted (together with a 4D signal (full detector plane signal) and the RF signal of the RF signal detector plane 30), and the band synthesis is carried out typically on the signal processing IC (integrated circuit) in the drive side (on the fixed circuit board).

And sensitivity corrections for sensitivities and delay time corrections are previously stored in the memory device 104, the stored information is read out by the pickup, the gain is adjusted on the basis of the read-out information, and then band synthesis is carried out. Since the initial values of the gain controller 35 and delay time controller 67 can be set only according to information from the memory device 104 and the initial values can accommodate variations between different pickups, the need for rough adjustment at the time of starting the adjustment can be eliminated, a time taken for initialization of the information reproduction apparatus can be shortened and the apparatus can be started in short time. Since the signal processing for the band synthesis can be attained with low cost, because the band synthesis can be integrated into the IC in the side of the fixed circuit board. Further, band synthesis using digital signals can also be attained. In addition, in order to cope with a variation in temperature or a change with time, fine adjustment is only required upon the adjustment even when a learning function (gain automatic controller) is required. Since the need for rough adjustment can be eliminated, the pickup can be made inexpensive.

That is, in the present arrangement, the electrically-readable/writable memory element is provided on the movable pickup, the selector for selecting any of the delay times of the first and second RF signals according to the speed rate on the basis of information stored in the memory element, and the initial value of the delay time according to the speed rate is set according to the information of the memory element read out from each present invention, thus shortening an initializing time necessary for tuning the delay time.

In the present arrangement, the first RF signal obtained by the RF signal detector provided independently of the servo signal detector and the second RF signal obtained by the servo signal detector on the pickup are simultaneously output. At the same time, the electrically-readable/writable memory element is provided on the pickup to previously record information about the output sensitivities of the first and second RF signals in the memory element. The gain controller is adjusted on the basis of the output sensitivity information. With the present arrangement, even the sensitivity information is read out from the electrically-readable/writable memory element on the movable pickup to perform the bandwidth combining, i.e. synthesizing, operation on the fixed circuit board. Since the initial value of not only the delay time but also the sensitivity (or sensitivity correction) is set according to information of the memory element read out from each pickup, the initializing time necessary for adjusting the entire sensitivity of the information reproduction apparatus can be shortened.

Figure 11:
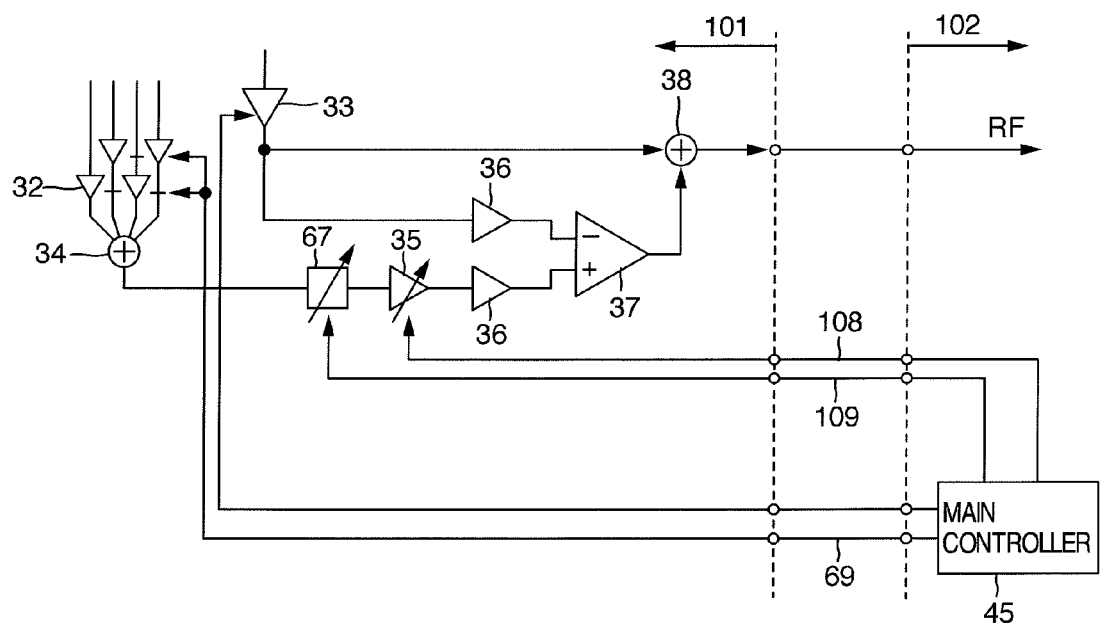
FIG. 11 is an example of the RF signal synthesis circuit when the circuit is mounted on a movable pickup in the present embodiment.

When the bandwidth combiner or synthesizer is mounted on the movable pickup in FIG. 11 unlike the above case, the correcting-gain switching signal line 108 is provided together with the gain switching signal line 69 for selecting the sensitivity of the photocurrent amplifier according to the type of the medium or to the speed rate, the gain controller 35 provided in any of the signal lines of the first and second RF signals is used to select the gain correction together with the sensitivity from the fixed circuit board. To this end, it becomes necessary to correct signal intensity differences caused by the sensitivity selection. With respect to the sensitivity of the photocurrent amplifier and the gain correction, it becomes necessary, in some cases, to set the sensitivity or the gain correction at a different value with switching each sensitivity. Such mutual calibration can be realized by providing the gain switching signal line separately from the correcting-gain switching signal line.

The delay time switching signal line 109 is provided between the pickup side and the fixed circuit board side, and the delay time controller 67 provided in any of the signal lines of the first and second RF signals to select the delay time, thus correcting a timing shift in the signal according to the sensitivity selection.

With such an arrangement, even when the sensitivity selection is carried out according to the type of the medium or to the speed rate, the sensitivity and timing of the first and second RF signals are tuned to match with each other in the band synthesis in response to each sensitivity, thus preventing the combined readout signal from being distorted. Since parts necessary for the adjustment can be aggregated on the pickup, the entire information reproduction apparatus can be made with low cost. Further, since the above correction is carried out on the pickup and the band synthesis can be carried out on the pickup, transmission lines for the RF signals extended between the movable pickup 101 and the fixed circuit board 102 can be combined into a single line, the number of RF signal lines especially requiring a high quality in high frequency signals can be reduced and therefore the signal characteristic can advantageously be stabilized against the line wiring.

(4) As in FIG. 1, the readout signal selector 106 for turning OFF the band synthesis according to the speed rate is provided to skip the band synthesis. Due to the selector, in place of the band-synthesized RF signal output from the bandwidth combiner, the first RF signal is selected as it is in the high-speed playback mode and used for the decoding of information recorded in the medium. As in FIG. 12, the RF signal selected by the readout signal selector 106 is used in the downstream stage including the equalizer 41, level detector 42, synchronous clock generator 43, and decoder 44. In the high-speed mode, the signal band range (readout signal frequency range) necessary for the decoding is shifted to its higher frequency side. This results in that a signal in the low frequency region (in the vicinity of DC) becomes unnecessary and the band synthesis becomes unnecessary. Since the unnecessary band synthesis function is removed, the first RF signal is directly used for the decoding, and the band synthesis amplifier as a noise source is removed from the signal line; a better jitter is obtained in the higher speed modes.

That is, with the present arrangement, the selector for switching between the output of the bandwidth combiner and the direct output of the first RF signal according to the medium type or the playback speed is provided to select the RF signal for the decoding. Due to the selection, the good RF signal of the exclusive RF detector plane can be used as it is for the decoding, thus increasing the reliability of read-out data.

Figure 13:
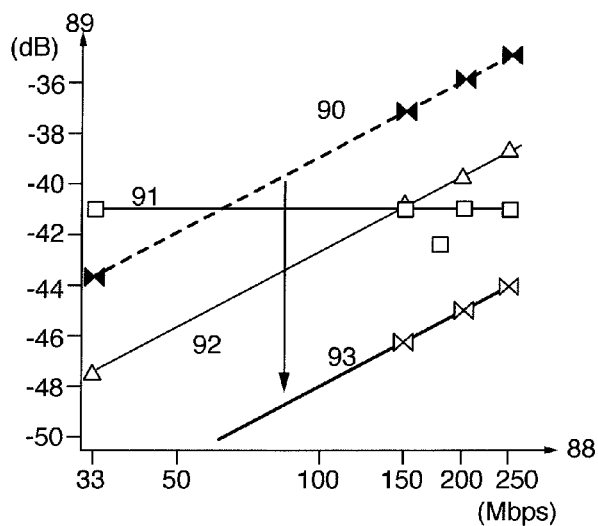
FIG. 13 is a graph for explaining the effect of the present embodiment for an increased speed.

When these means are combinedly used, the information reproduction apparatus of the present arrangement for reading out information from an information recording medium such as an optical disk can reproduce information at a high density and at a high speed. A DVD (digital versatile disk) as typical one of such information reproduction devices has such a noise characteristic as shown in FIG. 13. In the drawing, abscissa denotes transmission rate 88 and ordinate denotes noise intensity 89. A system noise intensity 90, which noise is generated mainly by the photocurrent amplifier, is higher than the noise intensity 91 of the medium itself such as a disk or than the intensity 92 of noise in a laser beam resultant from a variation in the laser light quantity. When the transmission rate is 60 Mbps or higher, the system noise intensity 90 dominates as a main noise factor and error rate increases. With the present arrangement, reduction of the noise of the photocurrent amplifier by 10 dB or more enables an improved system noise intensity 93, so that the transmission rate can be increased to 140 Mbps or more even with the other factors kept at the same noise intensity. In particular, when an information reproduction apparatus employs a blue laser beam and uses an information medium having a high density exceeding 10 Gbits/square inch that is limiting a laser beam power in the playback mode, the playback speed limitation by the noise of the photocurrent amplifier can be overcome, and information reproduction speed can be increased to more than 140 Mbps with securing a high reliability.

In this connection, the gain controller 35 is not limited to only an amplifier, and may be such an element as a semi-fixed resistor capable of variably adjusting an attenuation. The delay time controller 67 may be a delay line device or a delay signal line. The controller also may be implemented by processing a digital signal after sampled. The latter case will be explained in connection with an embodiment 2 which follows.

(Information Reproduction Apparatus Having a Delay Time Controller Based on Digital Operation)

Explanation will be made as to an information reproduction apparatus including an exclusive RF signal detector plane and also to the effects of the apparatus, by referring to FIGS. 14 to 17.

Figure 14:
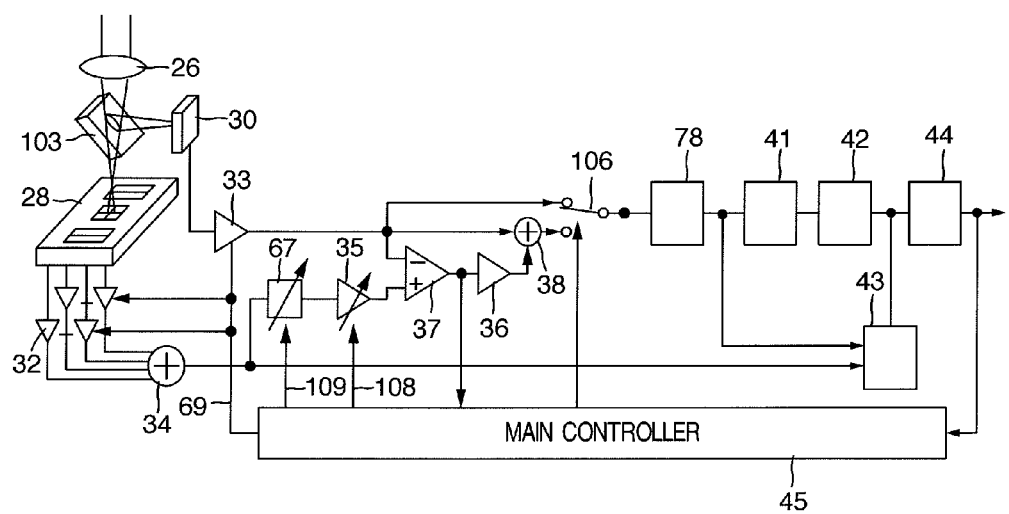
FIG. 14 is an exemplary configuration of a circuit for band synthesis based on an analog circuitry and for decoding based on digital signal processing in the present embodiment.

FIG. 14 is an extraction of a signal processing system when equalizing operation and the subsequent operations are carried out based on digital signal processing from the entire arrangement of FIG. 12. When compared with the entire arrangement of FIG. 12, an analog-to-digital converter 78 is added downstream of the readout signal selector 106. Further, the two low-pass filters 36 are combined into a single low-pass filter 36, and the low-pass filter 36 is located downstream of the subtractor 37. In the arrangement of FIG. 14, the band synthesis between the delay time controller 67 to the adder 38 is analogically carried out. With this arrangement, since the delay time controller 67 and a circuit between the gain controller 35 and the bandwidth combiner are mounted on the movable pickup and the part needing the adjustment can be separated from the circuit board 102, a pickup having a uniform performance can advantageously be manufactured easily. Further, when the sensitivity selector is of a multiple-stage type in order to cope with many types of media, its circuit configuration tends to become complicated.

Figure 15:
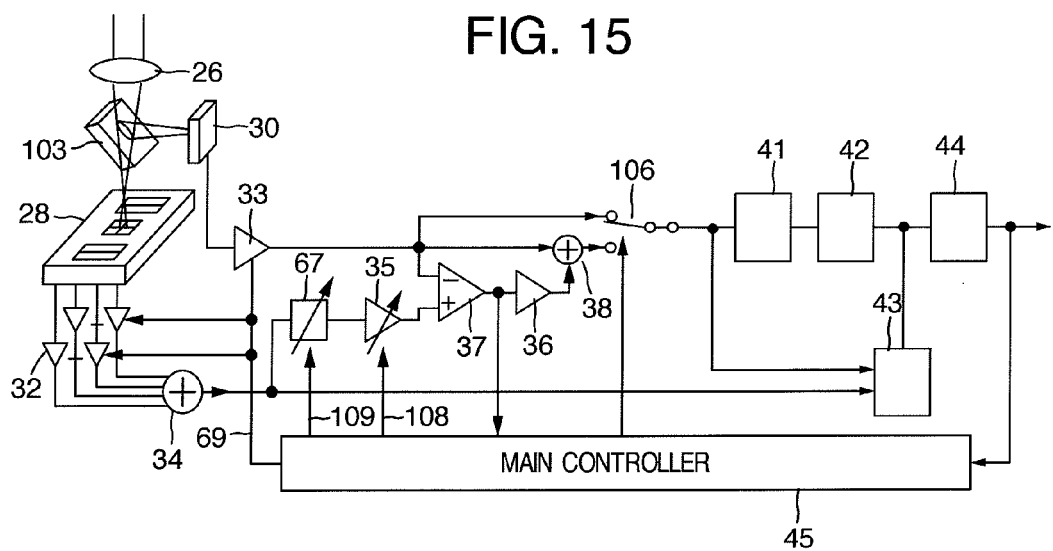
FIG. 15 is an exemplary configuration of a circuit for the band synthesis based on digital signal processing and for decoding operation in the present embodiment.

FIG. 15 shows a signal processing system when the processing including the bandwidth combiner is carried out based on digital signal processing. When compared with the arrangement of FIG. 14, the analog-to-digital converter 78 is provided for each of the two RF signals (first and second RF signals), and the bandwidth combiner subsequent to the delay time controller 67 and processing after the equalizing operation are both digitally calculated. In this arrangement, the bandwidth combiner between the delay time controller 67 and the gain controller 35 is implemented with use of an signal processing integrated circuit mounted on the fixed circuit board 102. This arrangement can eliminate the need for adjustment on an analog circuit. Thus when the selectivity selector is of a multiple-stage type so as to cope with many types of media, this arrangement can advantageously attained with a low cost. The arrangement of FIG. 15 requires the delay time controller 67 to be implemented based on digital calculating operation. The implementing method will next be explained with reference to FIGS. 16 and 17.

Figure 16:
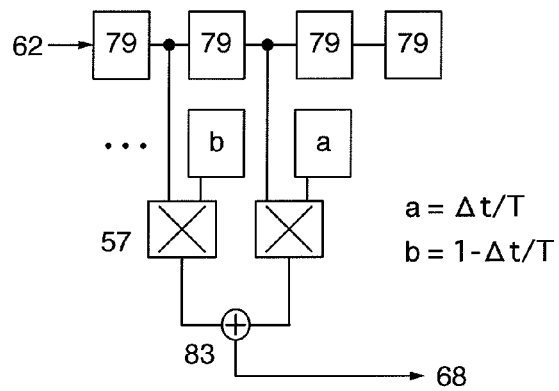
FIG. 16 is an exemplary configuration of a delay time controller based on digital signal processing in the present embodiment.
Figure 17:
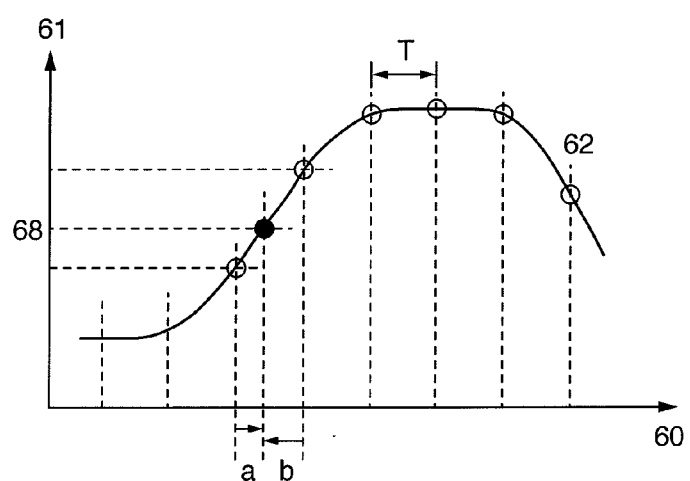
FIG. 17 is a graph for explaining the principle of operation of the delay time controller based on digital signal processing in the present embodiment.

FIG. 16 shows an example of an internal structure of the delay time controller 67 when the delay time controller 67 is implemented based on digital signal processing. In the drawing, abscissa denotes time 60 and ordinate denotes signal voltage 61. A readout signal 62 sampled at intervals of a constant time T is input to the delay time controller 67 from the analog-to-digital converter 78. Here, to obtain a time-delayed signal which timing delay is shorter than the sampling time interval T, weighted average (interpolate between) of two adjacent points on a sampling signal voltage, e.g., at a ratio of a:b as in FIG. 17 is engaged. As a result, a finely-delayed signal can be approximately obtained. In order to obtain a signal delayed by $\Delta t$ with respect to the sampling period T, $a=\Delta t/T$ and $b=1-(\Delta t/T)$ should be selected for the weighted-average operation.

The arrangement when the above operation is digitally carried out corresponds to FIG. 16. More specifically, the arrangement of FIG. 16 generates a train of signals when the input readout signal 62 is delayed by each time T by a plurality of 1-T clock delay circuits 79. The 'a' and 'b' shown in FIG. 16 are each multiplied at a multiplier 57 for adjacent two sampling signals in the signal train to obtain multiplied results of the two, and then added together at an adder 83 to obtain a weighted-average signal 68 after weighted average. The weighted-average signal 68 corresponds to an output of the delay time controller 67 having a delay time corresponding to a time of an integral multiple of T added by a given time $\Delta t$. As a result, even a readout signal delayed in steps of any (very) small time can be generated through the digital signal processing, and even in the high speed mode, an accurately time-difference corrected band-synthesized readout signal can be obtained.

That is, with this arrangement, the delay time variable controller adjusts a delay time difference smaller than the sampling time interval, by weighted-averaging adjacent two sampling signals in the series of sample signals sampled at intervals of a constant time. With it, since the delay-time tuning with very small time differences can be provided through computing operation (on software), such a hardware delay circuit as a delay line becomes unnecessary, hence low cost. Further, since any fine time adjustment can be accurately realized through computation and fine adjustment can be attained, the time difference can be nearly completely canceled, the quality of the combined readout signal can be made high, and thus the decoding can be achieved with less error.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical pickup comprising:
   a light source for emitting light;
   an objective lens for condensing light emitted from said light source on a recording medium;
   a first detector for detecting a first RF signal, with a first frequency characteristic including direct-current (DC), an amount of which is proportional to a total amount of light reflected by the recording medium and an error signal at a focus position of said objective lens;
   a second detector for detecting a second RF signal, with a second frequency characteristic at a higher range than the first frequency characteristic, an amount of which is proportional to the total amount of the reflected light from the recording medium; and
   a first controller for controlling a sensitivity of said first detector and a sensitivity of said second detector, and
   a second controller for adjusting a timing of said first and second RF signals and then band-synthesizing said first and second RF signals;
   wherein said first detector and said second detector are provided independently of each other.

2. The optical information reproduction system according to claim 1, further comprising a read-out signal selector for cancelling the band synthesis of said first and second RF signals in accordance with a data reading rate.

3. An optical information reproduction system comprising:
   a light source for emitting light;
   an objective lens for condensing light emitted from said light source on a recording medium;
   a servo signal detector for detecting a first RF signal, an amount of which is proportional to a total amount of light reflected by the recording medium and a servo signal;
   an RF-signal exclusive detector located independently of said servo signal detector for detecting a second RF signal with a frequency range higher than that of the first RF signal, an amount of which is proportional to the total amount of the reflected light from the recording medium;
   a decoder for band-synthesizing said first and second RF signals and decoding information from the band-synthesized RF signal; and
   a delay time variable controller for adjusting a delay time difference between said first and second RF signals.

4. The optical information reproduction system according to claim 3, wherein said delay time variable controller is provided for any of said first and second RF signals.

5. The optical information reproduction system according to claim 3, wherein said delay time variable controller weights and averages a train of sample signals sampled at intervals of a constant time to adjust a delay time.

6. The optical information reproduction system according to claim 3, wherein said delay time variable controller selects the delay time according to a type of said recording medium.

7. The optical information reproduction system according to claim 3, wherein said delay time variable controller selects the delay time according to a playback speed.

8. The optical information reproduction system according to claim 3, wherein said decoder selects said band-synthesized readout signal after band-synthesis and said second RF signal as for RF signals for use in decoding according to the type of the recording medium.

9. The optical information reproduction system according to claim 3, wherein said decoder selects said band-synthesized readout signal after band synthesis and said second RF signal as for RF signals for use in decoding according to a playback speed.

10. The optical information reproduction system according to claim 3, wherein, when said band-synthesizer is mounted on a movable pickup, a delay time switching signal line is provided for selecting a delay time correction for any of said first and second RF signals between a pickup side and a fixed circuit board side.

11. The optical information reproduction system according to claim 3, wherein, when said band-synthesizer is mounted on a movable pickup, a sensitivity switching signal line is provided for selecting a sensitivity of a photocurrent amplifier according to a type of the medium and to a playback speed, and a correcting-gain switching signal line is provided for selecting a gain correction of any of said first and second RF signals between a pickup side and a fixed circuit board side.

12. The optical information reproduction system according to claim 3, wherein an electrically-readable/writable memory element is provided on a movable pickup, and the delay time of any of said first and second RF signals is selected according to the type of the recording medium or to a speed rate on the basis of information recorded in said memory element.

13. The optical information reproduction system according to claim 3, further comprising a read-out signal selector for cancelling the band synthesis of said first and second RF signals in accordance with a data reading rate.

14. An optical information reproduction system comprising:
   a light source for emitting light to a recording medium;
   a servo signal detector for obtaining a position error signal of a focus position of an objective lens on the basis of a light quantity difference of reflected light; and
   an RF signal detector located independently of said servo signal detector;
   wherein said information reproduction system outputs a first RF signal obtained from said RF signal detector and a second RF signal obtained from said servo signal detector,
   wherein said first RF signal and said second RF signal are proportional to a total amount of light reflected from the recording medium,
   wherein said first RF signal has a higher frequency range than said second RF signal, and
   wherein an electrically-readable/writable memory element records information about sensitivity or adjusts timing of said first and second RF signals for band-synthesizing said first and second RF signals in said memory element.

15. The optical information reproduction system according to claim 14, wherein a read-out signal selector is provided to skip the band synthesis of said first and second RF signals in accordance with a data reading rate, and the first RF signal is selected for the decoding of information recorded in the recording medium.

16. The optical information reproduction system according to claim 14, wherein said first RF signal and said second RF signal are band-synthesized to obtain a synthesized readout signal and to decode information, and a sensitivity or gain of any of said first and second RF signals is adjusted on the basis of information of said readable/writable memory element.

* * * * *